(12) United States Patent
Park et al.

(10) Patent No.: US 8,352,517 B2
(45) Date of Patent: Jan. 8, 2013

(54) INFRASTRUCTURE FOR SPILLING PAGES TO A PERSISTENT STORE

(75) Inventors: Hoyong Park, San Jose, CA (US);
Namit Jain, Santa Clara, CA (US);
Anand Srinivasan, Bangalore (IN);
Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 300 days.

(21) Appl. No.: 12/395,871

(22) Filed: Mar. 2, 2009

(65) Prior Publication Data
US 2010/0223305 A1 Sep. 2, 2010

(51) Int. Cl.
*G06F 17/00* (2006.01)
(52) U.S. Cl. ........ 707/809; 707/708; 707/822; 707/825; 707/828; 707/758
(58) Field of Classification Search .................. 707/708, 707/822, 825, 828, 758, 809
See application file for complete search history.

(56) References Cited

U.S. PATENT DOCUMENTS

| | | | |
|---|---|---|---|
| 4,996,687 A | 2/1991 | Hess et al. |
| 5,495,600 A | 2/1996 | Terry et al. |
| 5,706,494 A | 1/1998 | Cochrane et al. |
| 5,822,750 A | 10/1998 | Jou et al. |
| 5,826,077 A | 10/1998 | Blakeley et al. |
| 5,857,182 A | 1/1999 | DeMichiel et al. |
| 6,006,235 A | 12/1999 | Macdonald et al. |
| 6,081,801 A | 6/2000 | Cochrane et al. |
| 6,128,610 A | 10/2000 | Srinivasan et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,370,537 B1 | 4/2002 | Gilbert et al. |
| 6,438,540 B2 | 8/2002 | Nasr et al. |
| 6,449,620 B1 | 9/2002 | Draper et al. |
| 6,453,314 B1 | 9/2002 | Chan et al. |
| 6,523,102 B1 * | 2/2003 | Dye et al. ...................... 711/170 |
| 6,546,381 B1 | 4/2003 | Subramanian et al. |

(Continued)

FOREIGN PATENT DOCUMENTS

EP 1241589 A2 9/2002
(Continued)

OTHER PUBLICATIONS

Abadi, et al., "Aurora: A Data Stream Management System," International Conference on Management of Data, Proceedings of the 2003 ACM SIGMOD International Conference on Management of Data, ACM Press, 2003, 4 pages.

(Continued)

*Primary Examiner* — Sana Al Hashemi
(74) *Attorney, Agent, or Firm* — Kilpatrick Townsend & Stockton LLP

(57) ABSTRACT

Techniques for managing memory usage in a processing system are provided. This may be achieved by receiving a data stream including multiple tuples and determining a query plan that was generated for a continuous query applied to the multiple tuples in the data stream. The query plan may include one or more operators. Before scheduling an operator in the query plan, it is determined when an eviction is to be performed based a level of free memory of the processing system. An eviction candidate is determined and a page associated with the eviction candidate is evicted from the memory to a persistent storage.

20 Claims, 9 Drawing Sheets

U.S. PATENT DOCUMENTS

| | | | |
|---|---|---|---|
| 6,708,186 | B1 | 3/2004 | Claborn et al. |
| 6,836,778 | B2 | 12/2004 | Manikutty et al. |
| 6,985,904 | B1 | 1/2006 | Kaluskar et al. |
| 7,020,696 | B1 | 3/2006 | Perry et al. |
| 7,145,938 | B2 | 12/2006 | Takeuchi et al. |
| 7,310,638 | B1 | 12/2007 | Blair |
| 7,376,656 | B2 | 5/2008 | Blakeley et al. |
| 7,383,253 | B1 | 6/2008 | Tsimelzon et al. |
| 7,403,959 | B2 | 7/2008 | Nishizawa et al. |
| 7,516,121 | B2 | 4/2009 | Liu et al. |
| 7,613,848 | B2 | 11/2009 | Amini et al. |
| 7,673,065 | B2 | 3/2010 | Srinivasan et al. |
| 7,739,265 | B2 | 6/2010 | Jain et al. |
| 7,912,853 | B2 | 3/2011 | Agrawal |
| 7,953,728 | B2 | 5/2011 | Hu et al. |
| 2002/0116371 | A1 | 8/2002 | Dodds et al. |
| 2002/0133484 | A1 | 9/2002 | Chau et al. |
| 2002/0169788 | A1 | 11/2002 | Lee et al. |
| 2003/0037048 | A1 | 2/2003 | Kabra et al. |
| 2003/0065659 | A1 | 4/2003 | Agarwal et al. |
| 2003/0229652 | A1 | 12/2003 | Bakalash et al. |
| 2004/0010496 | A1 | 1/2004 | Behrendt et al. |
| 2004/0064466 | A1 | 4/2004 | Manikutty et al. |
| 2004/0167864 | A1 | 8/2004 | Wang et al. |
| 2004/0168107 | A1 | 8/2004 | Sharp et al. |
| 2004/0220912 | A1 | 11/2004 | Manikutty et al. |
| 2004/0220927 | A1 | 11/2004 | Murthy et al. |
| 2004/0267760 | A1 | 12/2004 | Brundage et al. |
| 2005/0010896 | A1 | 1/2005 | Meliksetian et al. |
| 2005/0055338 | A1 | 3/2005 | Warner et al. |
| 2005/0065949 | A1 | 3/2005 | Warner et al. |
| 2005/0096124 | A1 | 5/2005 | Stronach |
| 2005/0097128 | A1 | 5/2005 | Ryan et al. |
| 2005/0154740 | A1 | 7/2005 | Day et al. |
| 2005/0174940 | A1 | 8/2005 | Iny |
| 2005/0177579 | A1 | 8/2005 | Blakeley et al. |
| 2005/0204340 | A1 | 9/2005 | Ruminer et al. |
| 2005/0229158 | A1 | 10/2005 | Thusoo et al. |
| 2006/0031204 | A1 | 2/2006 | Liu et al. |
| 2006/0085592 | A1 | 4/2006 | Ganguly et al. |
| 2006/0100969 | A1 | 5/2006 | Wang et al. |
| 2006/0106786 | A1 | 5/2006 | Day et al. |
| 2006/0224576 | A1 | 10/2006 | Liu et al. |
| 2006/0230029 | A1 | 10/2006 | Yan |
| 2006/0235840 | A1 | 10/2006 | Manikutty et al. |
| 2007/0022092 | A1 | 1/2007 | Nishizawa et al. |
| 2007/0039049 | A1 | 2/2007 | Kupferman et al. |
| 2007/0118600 | A1 | 5/2007 | Arora |
| 2007/0136239 | A1 | 6/2007 | Lee et al. |
| 2007/0136254 | A1 | 6/2007 | Choi et al. |
| 2007/0271280 | A1 | 11/2007 | Chandasekaran |
| 2007/0294217 | A1 | 12/2007 | Chen et al. |
| 2008/0005093 | A1 | 1/2008 | Liu et al. |
| 2008/0010241 | A1 | 1/2008 | McGoveran |
| 2008/0028095 | A1 | 1/2008 | Lang et al. |
| 2008/0046401 | A1 | 2/2008 | Lee et al. |
| 2008/0082514 | A1 | 4/2008 | Khorlin et al. |
| 2008/0114787 | A1 | 5/2008 | Kashiyama et al. |
| 2008/0120283 | A1 | 5/2008 | Liu et al. |
| 2008/0195577 | A1 | 8/2008 | Fan et al. |
| 2008/0301124 | A1 | 12/2008 | Alves et al. |
| 2008/0301256 | A1* | 12/2008 | McWilliams et al. ........ 709/214 |
| 2009/0043729 | A1 | 2/2009 | Liu et al. |
| 2009/0070785 | A1 | 3/2009 | Alvez et al. |
| 2009/0070786 | A1 | 3/2009 | Alves et al. |
| 2009/0100029 | A1 | 4/2009 | Jain et al. |
| 2009/0106189 | A1 | 4/2009 | Jain et al. |
| 2009/0106190 | A1 | 4/2009 | Srinivasan et al. |
| 2009/0106198 | A1 | 4/2009 | Srinivasan et al. |
| 2009/0106214 | A1 | 4/2009 | Jain et al. |
| 2009/0106215 | A1 | 4/2009 | Jain et al. |
| 2009/0106218 | A1 | 4/2009 | Srinivasan et al. |
| 2009/0106321 | A1 | 4/2009 | Das et al. |
| 2009/0106440 | A1 | 4/2009 | Srinivasan et al. |
| 2009/0112802 | A1 | 4/2009 | Srinivasan et al. |
| 2009/0112803 | A1 | 4/2009 | Srinivasan et al. |
| 2009/0144696 | A1 | 6/2009 | Andersen |
| 2009/0245236 | A1 | 10/2009 | Scott et al. |
| 2009/0248749 | A1 | 10/2009 | Gu et al. |
| 2009/0265324 | A1 | 10/2009 | Mordvinov et al. |
| 2010/0023498 | A1 | 1/2010 | Dettinger et al. |
| 2010/0057663 | A1 | 3/2010 | Srinivasan et al. |
| 2010/0057727 | A1 | 3/2010 | Srinivasan et al. |
| 2010/0057735 | A1 | 3/2010 | Srinivasan et al. |
| 2010/0057736 | A1 | 3/2010 | Srinivasan et al. |
| 2010/0057737 | A1 | 3/2010 | Srinivasan et al. |
| 2010/0094838 | A1 | 4/2010 | Kozak |
| 2010/0161589 | A1 | 6/2010 | Nica et al. |
| 2010/0223305 | A1 | 9/2010 | Park et al. |
| 2010/0223437 | A1 | 9/2010 | Park et al. |
| 2011/0022618 | A1 | 1/2011 | Thatte et al. |
| 2011/0023055 | A1 | 1/2011 | Thatte et al. |
| 2011/0029484 | A1 | 2/2011 | Park et al. |
| 2011/0029485 | A1 | 2/2011 | Park et al. |
| 2011/0270879 | A1 | 11/2011 | Srinivasan et al. |
| 2012/0041934 | A1 | 2/2012 | Srinivasan et al. |

FOREIGN PATENT DOCUMENTS

| | | |
|---|---|---|
| WO | WO 00/49533 A2 | 8/2000 |
| WO | WO 01/59602 A2 | 8/2001 |
| WO | WO 01/65418 A2 | 9/2001 |
| WO | WO 03/030031 A2 | 4/2003 |

OTHER PUBLICATIONS

Aho, et al., "Efficient String Matching: An Aid to Bibliographic Search," Communications of the ACM, Jun. 1975, vol. 18, No. 6, pp. 333-340, Copyright 1975, Association for Computing Machinery, Inc.

Arasu, "CQL: A language for Continuous Queries over Streams and Relations," Lecture Notes in Computer Science, 2004, vol. 2921/2004, pp. 1-19.

Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.

Arasu, et al., "An Abstract Semantics and Concrete Language for Continuous Queries over Streams and Relations," 9th International Workshop on Database programming languages, Sep. 2003, 11 pages.

Arasu, et al., "STREAM: The Stanford Data Stream Management System," Department of Computer Science, Stanford University, 2004, p. 21.

Avnur, et al., "Eddies: Continuously Adaptive Query Processing," In Proceedings of the 2000 ACM SIGMOD International Conference on Data, Dallas TX, May 2000, 12 pages.

Avnur, et al., "Eddies: Continuously Adaptive Query Processing," slide show, believed to be prior to Oct. 17, 2007, 4 pages.

Babu, et al., "Continuous Queries over Data Streams," SIGMOD Record, Sep. 2001, vol. 30, No. 3, pp. 109-120.

Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.

Bose, et al., "A Query Algebra for Fragmented XML Stream Data", 9th International Conference on Data Base Programming Languages (DBPL), Sep. 6-8, 2003, Potsdam, Germany, at URL: http://lambda.uta.edu/dbp103.pdf, 11 pages.

Buza, "Extension of CQL over Dynamic Databases," Journal of Universal Computer Science, 2006, vol. 12, No. 9, pp. 1165-1176.

Carpenter, "User Defined Functions," Oct. 12, 2000, at URL: http://www.sqlteam.com/itemprint.asp?ItemID=979, 4 pages.

Chan, et al., "Efficient Filtering of XML documents with Xpath expressions," VLDB Journal, 2002, pp. 354-379.

Chandrasekaran, et al., "TelegraphCQ: Continuous Dataflow Processing for an Uncertain World," Proceedings of CIDR 2003, 12 pages.

Chen, et al., "NiagaraCQ: A Scalable Continuous Query System for Internet Databases," Proceedings of the 2000 SIGMOD International Conference on Management of Data, May 2000, pp. 379-390.

Colyer, et al., "Spring Dynamic Modules Reference Guide," Copyright 2006-2008, ver. 1.0.3, 73 pages.

Colyer, et al., "Spring Dynamic Modules Reference Guide," Copyright 2006-2008, ver. 1.1.3, 96 pages.
"Complex Event Processing in the Real World," an Oracle White Paper, Sep. 2007, 13 pages.
Conway, "An Introduction to Data Stream Query Processing," Truviso, Inc., May 24, 2007, at URL: http://neilconway.org/talks/stream_intro.pdf, 71 pages.
"Coral8 Complex Event Processing Technology Overview," Coral8, Inc., Make it Continuous, pp. 1-8, Copyright 2007, Coral8, Inc.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
Demers, et al., "Towards Expressive Publish/Subscribe Systems," Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
Deshpande, et al., "Adaptive Query Processing," slide show believed to be prior to Oct. 17, 2007, 27 pages.
"Developing Applications with Weblogic Server," BEA WebLogic Server, Mar. 30, 2007, ver. 10.0, 254 pages.
Diao, "Query Processing for Large-Scale XML Message Brokering," 2005, University of California Berkeley, 226 pages.
Diao, et al. "Query Processing for High-Volume XML Message Brokering", Proceedings of the 29th VLDB Conference, Berlin, Germany, 2003, 12 pages.
Dindar, et al., "Event Processing Support for Cross-Reality Environments," Pervasive Computing, IEEE CS, Jul.-Sep. 2009, pp. 2-9, Copyright 2009, IEEE.
"EPL Reference," BEA WebLogic Event Server, Jul. 2007, ver. 2.0, 82 pages.
Esper Reference Documentation, Copyright 2007, ver. 1.12.0, 158 pages.
Esper Reference Documentation, Copyright 2008, ver. 2.0.0, 202 pages.
Fernandez, et al., "Build your own XQuery processor", slide show, at URL: http://www.galaxquery.org/slides/edbt-summer-school2004.pdf, 2004, 116 pages.
Fernandez, et al., Implementing XQuery 1.0: The Galax Experience:, Proceedings of the 29th VLDB Conference, Berlin, Germany, 2003, 4 pages.
Florescu, et al., "The BEA/XQRL Streaming XQuery Processor," Proceedings of the 29th VLDB Conference, 2003, Berlin, Germany, 12 pages.
"Getting Started with WebLogic Event Server," BEA WebLogic Event Server, Jul. 2007, ver. 2.0, 66 pages.
Gilani, "Design and implementation of stream operators, query instantiator and stream buffer manager," Dec. 2003, 137 pages.
Golab, "Sliding Window Query Processing Over Data Streams," University of Waterloo, Waterloo, Ont. Canada, Aug. 2006, 182 pages.
Golab, et al., "Issues in Data Stream Management," ACM SIGMOD Record, vol. 32, issue 2, Jun. 2003, ACM Press, pp. 5-14.
Gosling, et al., "The Java Language Specification," Book, copyright 1996-2005, 3rd edition, 684 pages, Sun Microsystems USA.
Hopcroft, "Introduction to Automata Theory, Languages, and Computation," Second Edition, Addison-Wesley, Copyright 2001, 524 pages.
"Installing Weblogic Real Time," BEA WebLogic Real Time, Jul. 2007, ver. 2.0, 64 pages.
"Introduction to BEA WebLogic Server and BEA WebLogic Express," BEA WebLogic Server, Mar. 2007, ver. 10.0, 34 pages.
"Introduction to WebLogic Real Time," BEA WebLogic Real Time, Jul. 2007, ver. 2.0, 20 pages.

"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.
Jin, et al. "ARGUS: Efficient Scalable Continuous Query Optimization for Large-Volume Data Streams" 10th International Database Engineering and Applications Symposium (IDEAS'06), 2006, 7 pages.
Kawaguchi, "Java Architecture for XML Binding _ (JAXB) 2.0," Sun Microsystems, Inc., Apr. 19, 2006, 384 pages.
Knuth, et al., "Fast Pattern Matching in Strings," SIAM J. Comput., vol. 6, No. 2, Jun. 1977, pp. 323-350.
Lakshmanan, et al., "On efficient matching of streaming XML documents and queries," 2002, 18 pages.
Lindholm, et al., "Java Virtual Machine Specification, 2nd Edition", Prentice Hall, Apr. 1999, 484 pages.
Liu, et al., "Efficient XSLT Processing in Relational Database System," Proceeding of the 32nd. International Conference on Very Large Data Bases (VLDB), Sep. 2006, 1106-1116, 11 pages.
Luckham, "What's the Difference Between ESP and CEP?" Complex Event Processing, downloaded Apr. 29, 2011, at URL: http://complexevents.com/?p=103, 5 pages.
Madden, et al., "Continuously Adaptive Continuous Queries (CACQ) over Streams," SIGMOD 2002, Jun. 4-6, 2002, 12 pages.
"Managing Server Startup and Shutdown," BEA WebLogic Server, Mar. 30, 2007, ver. 10.0, 134 pages.
"Matching Behavior," .NET Framework Developer's Guide, Copyright 2008 Microsoft Corporation, downloaded Jul. 1, 2008 from URL: http://msdn.microsoft.com/en-us/library/0yzc2yb0(printer).aspx, pp. 1-2.
Motwani, et al., "Models and Issues in Data Streams," Proceedings of the 21st ACM SIGMOD-SIGACT-SIDART symposium on Principles f database systems, 2002, 30 pages.
Motwani, et al., "Query Processing Resource Management, and Approximation in a Data Stream Management System," Proceedings of CIDR 2003, Jan. 2003, 12 pages.
Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.
"New Project Proposal for Row Pattern Recognition—Amendment to SQL with Application to Streaming Data Queries," H2-2008-027, H2 Teleconference Meeting, Jan. 9, 2008, pp. 1-6.
Novick, "Creating a User Defined Aggregate with SQL Server 2005," at URL: http://novicksoftware.com/Articles/sql-2005-product-user-defined-aggregate.html, 2005, 6 pages.
Oracle Database, SQL Language Reference, 11g Release 1 (11.1), B28286-02, Sep. 2007, 1496 pages, Oracle.
Oracle Application Server 10g, Release 2 and 3, New Features Overview, An Oracle White Paper, Oct. 2005, 48 pages, Oracle.
Oracle Application Server, Administrator's Guide, 10g Release 3 (10.1.3.2.0), B32196-01, Jan. 2007, 376 pages, Oracle.
Oracle Application Server, Enterprise Deployment Guide, 10g Release 3 (10.1.3.2.0), B32125-02, Apr. 2007, 120 pages, Oracle.
Oracle Application Server, High Availability Guide, 10g Release 3 (10.1.3.2.0), B32201-01, Jan. 2007, 314 pages, Oracle.
"Oracle CEP Getting Started," Release 11gR1 (11.1.1) E14476-01, May 2009, 172 pages.
Oracle Database Data Cartridge Developer's Guide, B28425-03, 11g Release 1 (11.1), Oracle, Mar. 2008, 372 pages, Oracle.
Oracle Database, SQL Reference, 10g Release 1 (10.1), Part No. B10759-01, Dec. 2003, pp. 7-1 to 7-17; 7-287 to 7-290; 14-61 to 14-74.
"OSGI Service Platform Core Specification, The OSGI Alliance," Apr. 2007, ver. 4.1, release 4, 288 pages, OSGI Alliance.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.

PostgresSQL: Documentation: Manuals: PostgresSQL 8.2: User-Defined Aggregates, believed to be prior to Apr. 21, 2007, 4 pages.
"Release Notes," BEA WebLogic Event Server, Jul. 2007, ver. 2.0, 8 pages.
Sadri, et al., "Expressing and Optimizing Sequence Queries in Database Systems," ACM Transactions on Database Systems, Jun. 2004, vol. 29, No. 2, pp. 282-318, ACM Press, Copyright 2004.
Sadtler, et al., "WebSphere Application Server Installation Problem Determination," Copyright 2007, pp. 1-48, IBM Corp.
Sharaf, et al., Efficient Scheduling of Heterogeneous Continuous Queries, VLDB '06, Sep. 12-15, 2006, pp. 511-522.
Spring Dynamic Modules for OSGi Service Platforms product documentation, SpringSource, Jan. 2008, 71 pages.
"Stanford Stream Data Manager," at URL: http://infolab.stanford.edu/stream/, last modified Jan. 5, 2006, pp. 1-9.
Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.
Stream Query Repository: Online Auctions (CQL Queries), at URL: http://www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
"Stream: The Stanford Stream Data Manager," IEEE Data Engineering Bulletin, Mar. 2003, pp. 1-8.
Streambase 5.1 product documentation, Streambase Systems, copyright 2004-2010, 878 pages.
Terry, et al., "Continuous queries over append-only database," Proceedings of 1992 ACM SIGMOD, pp. 321-330.
"Understanding Domain Configuration," BEA WebLogic Server, Mar. 30, 2007, ver. 10.0, 38 pages.
Vajjhala, et al, "The Java™ Architecture for XML Binding (JAXB) 2.0," Sun Microsystem, Inc., Final Release Apr. 19, 2006, 384 pages.
W3C, "XML Path Language (Xpath)," W3C Recommendation, Nov. 16, 1999, ver. 1.0, at URL: http://www.w3.org/TR/xpath, 37 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke, "XML Query," Mar. 14, 2004, 29 pages.
De Castro Alves; et al, "Extensible Indexing Framework Using Data Cartridges," U.S. Appl. No. 12/913,636, filed Oct. 27, 2010.
Park, et al., "Spatial Data Cartridge for Event Processing Systems," U.S. Appl. No. 12/949,081, filed Nov. 18, 2010.
De Castro Alves; et al, "Extensibility Platform Using Data Cartridges," U.S. Appl. No. 12/957,194, filed Nov. 30, 2010.
De Castro Alves; et al, "Class Loading Using Java Data Cartridges," U.S. Appl. No. 13/089,556, filed Apr. 19, 2011.
De Castro Alves; et al, "Extensible Language Framework Using Data Cartridges," U.S. Appl. No. 12/957,201, filed Nov. 30, 2010.
Non-Final Office Action for U.S. Appl. No. 12/396,008, mailed on Jun. 8, 2011, 10 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 200 pages.
Notice of Allowance for U.S. Appl. No. 11/874,202, mailed on Dec. 22, 2010, 29 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874, 896, mailed on Nov. 22, 2010, 25 pages.
Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.
Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 8 pages.
Non-Final Office Action for U.S. Appl. No. 11/601,415, mailed on Sep. 17, 2008, 10 pages.
Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 2009, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948, 523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.

Hao et al. "Achieving high performance web applications by service and database replications at edge servers," proceedings of IPCCC 2009, IEEE 28th International Performance Computing and Communications Conference, pp. 153-160 (Dec. 2009).

Martin el al "Finding application errors and security flaws using PQL: a program query language," Proceedings of the 20th annual ACM SIGPLAN conference on Object-oriented programming, systems, languages, and applications 40:1-19 (Oct. 2005).

"Oracle Complex Event Processing CQL Language Reference," 11g Release 1 (11 1.1) E12048-01, Apr. 2010, 540 pages.

Office Action for U.S. Appl. No. 12/534,384 (Feb. 28, 2012).
Office Action for U.S. Appl. No. 12/506,905 (Mar. 26, 2012).
Office Action for U.S. Appl. No 12/548,209 (Apr. 16, 2012).
Notice of Allowance for U.S. Appl. No. 13/184,528 (Mar. 1, 2012).
International Search Report dated for PCT/US2011/052019 (Nov. 17, 2011).
Notice of Allowance for U.S. Appl. No. 12/396,008 (Nov. 16, 2011).
Office Action for U.S. Appl. No. 12/506,891 (Dec. 14, 2011).
Office Action for U.S. Appl. No. 12/534,398 (Nov. 11, 2011).
Office Action for U.S. Appl. No. 11/601,415 (Dec. 9, 2011).
Office Action for U.S. Appl. No. 12/548,187 (Jun. 20, 2012).
Office Action for U.S. Appl. No. 12/548,222 (Jun. 20, 2012).
Office Action for U.S. Appl. No. 12/534,398 (Jun. 5, 2012).
Office Action for U.S. Appl. No. 12/548,281 (Jun. 20, 2012).
Office Action for U.S. Appl. No. 12/913,636 (Jun. 7, 2012).
Notice of Allowance for U.S. Appl. No. 12/874,197 (Jun. 22 2012).

* cited by examiner

INFRASTRUCTURE FOR SPILLING PAGES TO A PERSISTENT STORE

CROSS-REFERENCES TO RELATED APPLICATIONS

The present application incorporates by reference for all purposes the entire contents of the following related applications filed concurrently with the present application:

(1) U.S. patent application Ser. No. 12/396,464, filed Mar. 2, 2009, entitled "Framework for Reducing Workload Memory Size by Dynamically Generating Tuple and Page Classes,"; and (2) U.S. patent application Ser. No. 12/396,008, filed Mar. 2, 2009, entitled "Method and System for Spilling From a Queue to a Persistent Store".

BACKGROUND OF THE INVENTION

Embodiments of the present invention relate to memory management, and more specifically to techniques for spilling data from memory to a persistent store based upon an evict policy.

In applications such as stock quote monitoring, automobile traffic monitoring, and data sensing, data is typically generated in the form of a stream of events over time. A data stream, also referred to as an event stream, is a real-time, continuous, sequence of events. Examples of sources that generate data streams include sensors and probes (e.g., RFID sensors, temperature sensors, etc.) configured to send a sequence of sensor readings, financial tickers, network monitoring and traffic management applications sending network status, click stream analysis tools, and others. The term "events" are used interchangeably with "tuples". As used herein, tuples of a stream have the same set of attributes. Each tuple is also associated with a particular time. A tuple may be considered to be logically similar to a single row or record in a relational database.

Processing the data streams is often referred to as "stream processing." The data streams may be processed to detect complex patterns, event correlations, relationships between events, etc. For example, a sensor placed at a particular section of a highway may output a data stream comprising information detected by the sensor about automobiles that pass the particular section. A data stream output by the sensor may include information such as the type of automobile, the speed of the automobile, the time that the automobile was on the particular section, and other like information. This data stream may then be processed to determine heavy traffic congestion conditions (indicated by slow average speeds of automobiles), and other traffic related conditions or patterns.

In traditional database systems data is stored in a database, for example in tables in a database. The data stored in a database represents a bounded finite data set against which queries and other data manipulation operations may be performed using a data management language such as SQL. SQL and other traditional database management tools and algorithms are designed based upon the assumption that the tools and algorithms are executed against a finite, collection of data. Such traditional tools and algorithms are not conducive for handling data streams, as described above, due to the possibly continuous and unbounded nature of data received via the data streams. Further, storing event data in a table is impractical due to the large amounts of data that is continually received and the fast frequency at which the data may be received. Due to the ever increasing number of applications that transmit data in the form of a data stream, the ability to process such data streams has become important.

BRIEF SUMMARY OF THE INVENTION

Embodiments of the present invention provide memory management techniques for handling processing of data streams, including bursty data streams. In one embodiment, tuples received by a processing system in a data stream are stored in the memory (e.g., RAM) of the processing system in the form of pages (sets of tuples). The pages, comprised of tuples, are automatically spilled from the memory to persistent storage (e.g., disk) based upon memory usage levels, as specified by an evict policy. This automatic spilling of data from processing memory to persistent store enables the processing system to manage more efficiently the available memory thereby allowing the processing system to handle processing of data streams, including bursty data streams, without significantly hampering the performance of the processing system.

In one embodiment, techniques for managing memory usage in a processing system are provided. This may be achieved by receiving a data stream including multiple tuples and determining a query plan that was generated for a continuous query applied to the multiple tuples in the data stream. The query plan may include one or more operators. Before scheduling an operator in the query plan, it is determined when an eviction is to be performed based on a level of free memory of the processing system. An eviction candidate is determined and a page associated with the eviction candidate is evicted from the memory to a persistent storage.

A further understanding of the nature and the advantages of the inventions disclosed herein may be realized by reference of the remaining portions of the specification and the attached drawings.

BRIEF DESCRIPTION OF THE DRAWINGS

The invention may best be understood by reference to the following description taken in conjunction with the accompanying drawings in which.

DETAILED DESCRIPTION OF THE INVENTION

Figure 1A:
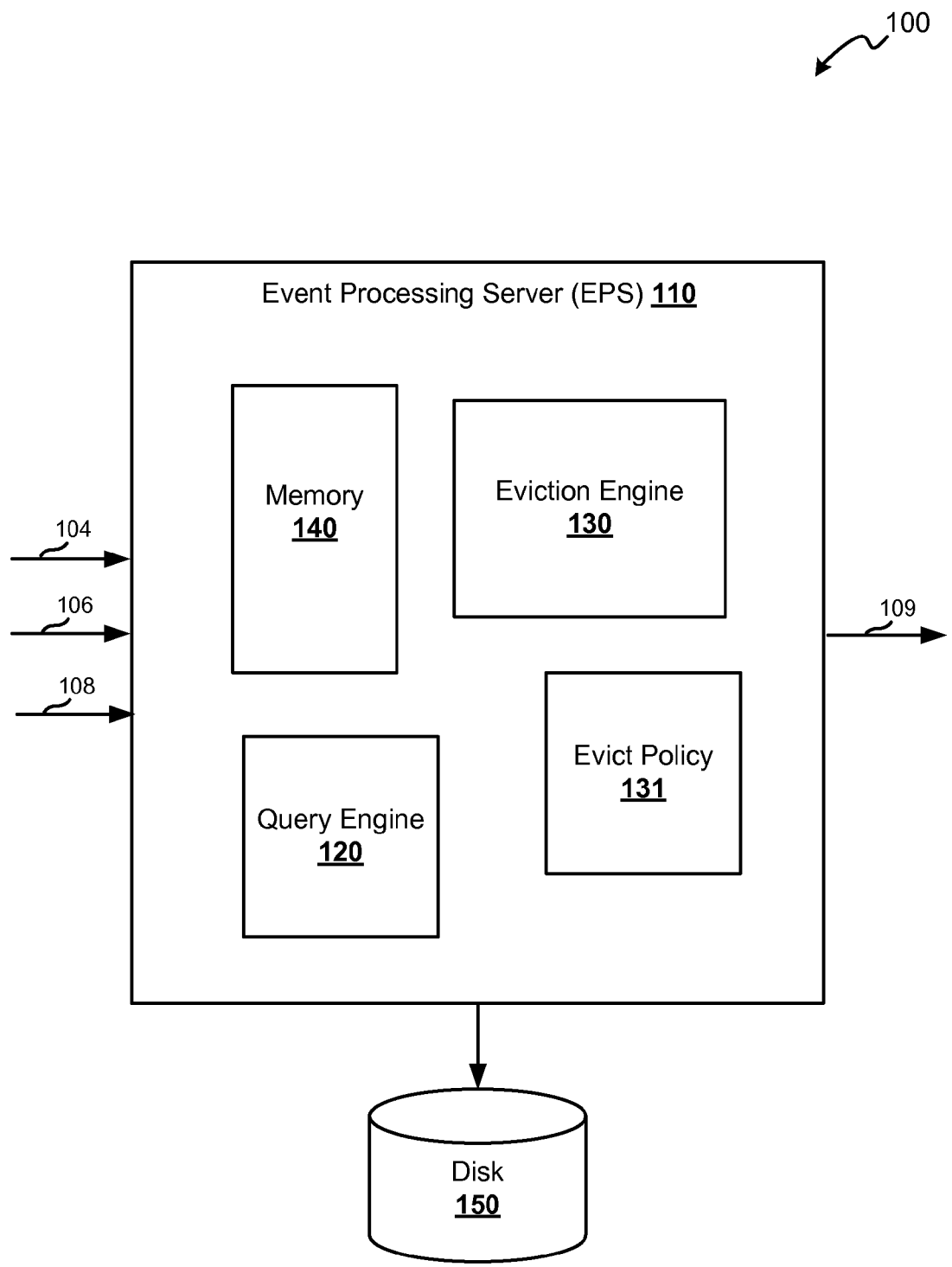
FIG. 1A is a simplified block diagram of a system that incorporates an embodiment of the present invention.

In the following description, for the purposes of explanation, specific details are set forth in order to provide a thorough understanding of embodiments of the invention. However, it will be apparent that the invention may be practiced without these specific details.

A data stream or event stream is a real-time, continuous, sequence of events or tuples. The stream thus represents sets of data. The elements in the data stream can be viewed as a series of events and accordingly the data stream is also referred to as an event stream. Events may include temperature readings from a sensor such as 10°, 15°, 20°, etc. When a data stream is received by a system that is configured to process the data stream, referred to as an event processing server (EPS), the data stream is stored in a memory, such as random access memory (RAM), of the EPS as a sequence of <tuple, timestamp> pairs. The timestamps associated with tuples define an order in which the tuples are received. Timestamps in the data stream reflect an application's notion of time. The timestamp is part of the schema of the data stream, and two or more tuples can have the same timestamp or different timestamps.

An EPS may receive data streams either using a push or pull paradigm from one or more sources. In the case of a pull paradigm, the EPS pulls the data streams from a source as needed, and as such, the amount of data received by the EPS is automatically controlled by the EPS itself. On the other hand, in the more commonly used push paradigm, the data streams are pushed to the EPS by the source of the data stream. Accordingly, in a push paradigm, the EPS is agnostic to the existence of the source, and cannot control either the data streams or the frequency at which data is received by the EPS. Since the events received in a data stream are typically stored in the processing memory (e.g., RAM) of the EPS for processing, uncontrolled receipt of data streams may cause the memory to quickly fill up, especially if the data stream is a bursty stream. This may cause the EPS to face a memory shortage or even run out of memory thereby severely hampering the performance of the EPS and may even cause it to crash.

Embodiments of the present invention provide memory management techniques for handling processing of data streams, including bursty data streams. In one embodiment, tuples received by a processing system in a data stream are stored in the memory (e.g., RAM) of the processing system in the form of pages (sets of tuples). The pages, comprised of tuples, are automatically spilled from the memory to persistent storage (e.g., disk) based upon memory usage levels, as specified by an evict policy. This automatic spilling of data from processing memory to persistent store enables the processing system to more efficiently manage available memory thereby allowing the processing system to handle processing of data streams, including bursty data streams, without significantly hampering the performance of the processing system. As used herein, the terms eviction and spilling are used interchangeably.

FIG. 1A is a simplified block diagram of a system 100 that incorporates an embodiment of the present invention. As depicted in FIG. 1A, system 100 includes an event processing server (EPS) 110 that is configured to receive one or more data streams 104, 106, and 108. Streams 104, 106, and 108 may be received from one or more sources including a database, a file, a messaging service, various applications, devices such as various types of sensors (e.g., RFID sensors, temperature sensors, etc.), tickers, etc. In one embodiment of the present invention, event sources are configured to generate data streams 104, 106, 108. Event sources are event-driven applications. The tuples in the one or more streams 104, 106, and 108 are received by EPS 110 in a sequence at specific time points. EPS 110 may receive streams 104, 106, and 108 via a push-based mechanism or a pull-based mechanism or other mechanisms.

EPS 110 may be configured to perform various types of processing on the incoming streams 104, 106, and 108 such as running continuous queries on the incoming data streams, detecting patterns in the incoming events, etc. EPS 110 may generate an output stream of tuples 109 resulting from the processing. For example, output stream 109 may comprise a sequence of tuples resulting from a continuous query applied to one or more of streams 102, 106, and 108.

In the embodiment depicted in FIG. 1A, EPS 110 includes memory 140, an eviction engine 130, evict policy 131, and a query engine 120. Memory 140 is shown as being contained within EPS 110, but may be located elsewhere in other embodiments of the invention. In one embodiment, memory 140 may be random access memory ("RAM").

In a typical scenario, the data received via the data streams is stored in memory 140 awaiting processing of the data. Memory 140, for example RAM, is configured to store <tuple, timestamp> pairs. In addition to the tuples, memory 140 also stores workload associated with processing of the tuples, such as during execution of a query on the tuples. Data structures associated with the tuples may include data structures such as a queue, a store, a synopsis, and overhead for these structures in memory. A queue passes state data of the tuple from one operator to another, for example during execution of a query plan. A store is a data structure which maintains intermediate states of the tuple for performance of operations by operators. In one embodiment of the present invention, the store data structure is optimized to store specific types of state data, for example in a single list or a double list.

Evict Policy 131 is configured to store information specifying how spilling from memory 140 to persistent store (e.g., disk 150) is to be performed. In one embodiment, evict policy 131 specifies when to evict and what to evict. The determination of when to spill is tied to the level of free memory available in memory 140. For example, evict policy 131 may specify that spilling is to be performed if the level of free memory falls below a threshold. A free memory level is the measurement of memory that is available at the time of measurement. In one embodiment, a weighted average of the consumption of free memory may be used. The level of free memory may be determined by measuring, for example, memory 140 and/or other memory units associated with EPS. If the free memory level falls below the threshold, evict policy 131 may require that an eviction be performed.

In one embodiment, a set of tuples may be stored as a page structure within memory 140. A page may be an array of tuples or other similar construct. One or more pages may be stored in memory 140. Pages provide a mechanism for facilitating management and manipulation of tuples. According to an embodiment of the present invention, for purposes of efficiency, spilling of tuples from memory 140 to persistent store 150 is done at the page level. In alternative embodiments, spilling may also be performed at the tuple level.

As described above, evict policy 131 also specifies what is to be evicted. In embodiments where spilling is performed at the granularity of a page, evict policy 131 specifies how to identify which pages of tuples are to be spilled from memory 140 to disk 150. As provided herein, the selection of what to evict may be for a finer level of granularity, such as a data structure level, other object level, or other local level at which the eviction policy is applied.

In one embodiment, spilling of tuples and pages may be based upon a query plan generated by EPS 110 for execution of a continuous query being applied to the tuples. A query plan is a series of steps or operations that are to be executed to fulfill the query. A query plan may include one or more operators which specify the operations to be executed. For example, operator-level spilling may be specified, where data structures of a tuple corresponding to an operator of a query plan is selected for spilling. Operators are executed on the data structures of tuples, and as such, operators can be said to be associated therewith.

Evict policy 131 can be applied at other levels of granularity, such as a global level and a data structure level. For example, many local eviction policies may be implemented for different levels of data structures (e.g., application level, operator level, store level, queue level, etc.). As previously mentioned, data structures may include queues and stores as shown in query plan 160 of FIG. 1B, and a synopsis. In another embodiment, the eviction policy is applied globally for whole data structures in the system.

Eviction engine 130 is configured to enforce evict policy 131. Eviction engine 130 is configured to identify a threshold and compare the level of free memory to the identified threshold in order to determine when to evict. If the free memory level falls below the threshold, eviction engine 130 determines that spilling is to be performed. Eviction engine 130 is also configured to perform actions. Actions may include spilling data from memory 140 to persistent storage (e.g. disk) 150. Eviction or spilling of pages (or data in general) from memory 140 to disk 150 frees available memory in memory 140 thereby increasing the free memory level of memory 140.

Query engine 120 is configured to run a continuous query on tuples by performing the series of steps or operations to fulfill the query, as set out in the query plan. Prior to performing the steps to fulfill the query, query engine 120 is configured to schedule the operators in the query plan and to spill a page from memory 140 to disk 150. Query engine 120 is also configured to determine the page for spilling. This determination is made by using the object (operator, data structure, page, etc.) selected for spilling to determine the page within which the selected object is organized. Spilling may be performed by removing the page from memory 140 and writing the page to disk 150. Additionally, query engine 120 is configured to process the incoming streams 104, 106, and 108 for example by running a continuous query on the incoming event stream, etc.

Enforcement of evict policy 131 may be triggered upon the occurrence of various conditions. For example, eviction engine 130 may be triggered to enforce evict policy 131 when an operator of a query plan is to be scheduled, and other conditions. For example, upon occurrence of a signal to schedule an operator of the query plan, eviction engine 130 may be configured to identify a threshold and compare the free memory level with the identified threshold in order to determine when eviction or spilling is to be performed. In one embodiment, the triggering condition of the evict policy may be user configurable. Eviction engine 130 is also configured to select an object (operator, data structure, page, etc.) for spilling according to evict policy 131 and to perform actions, such as spilling. In one embodiment the actions may be performed by eviction engine 130 or eviction engine 130 may facilitate the performance of the actions. Query engine 120 is configured to determine the page which contains the selected objects and to spill pages from memory 140 to disk 150.

Disk 150 provides a persistent memory for storing pages of tuples that are spilled from memory 140 according to evict policy 131. Disk 150 may be internal or external to EPS 110. As shown in FIG. 1A, disk 150 is external to EPS 110. In general, disk 150 may be in a location accessible to eviction engine 130 for purposes of spilling pages from memory 140.

The use of evict policy 131 enables EPS 110 to more efficiently and automatically perform memory management to ensure that the level of free memory does not fall below a certain level. By performing management techniques, the performance of EPS 110 is greatly enhanced. For example, with more available space in memory 140, EPS 110 is able to handle faster streams, larger window sizes, and workloads which exceed the maximum size of memory 140.

While the evict policy is being enforced, both of the evicted and non-evicted tuples may be processed by query engine 120 on the incoming data stream. After processing, output data stream 109 is provided by the EPS 110.

Figure 1B:
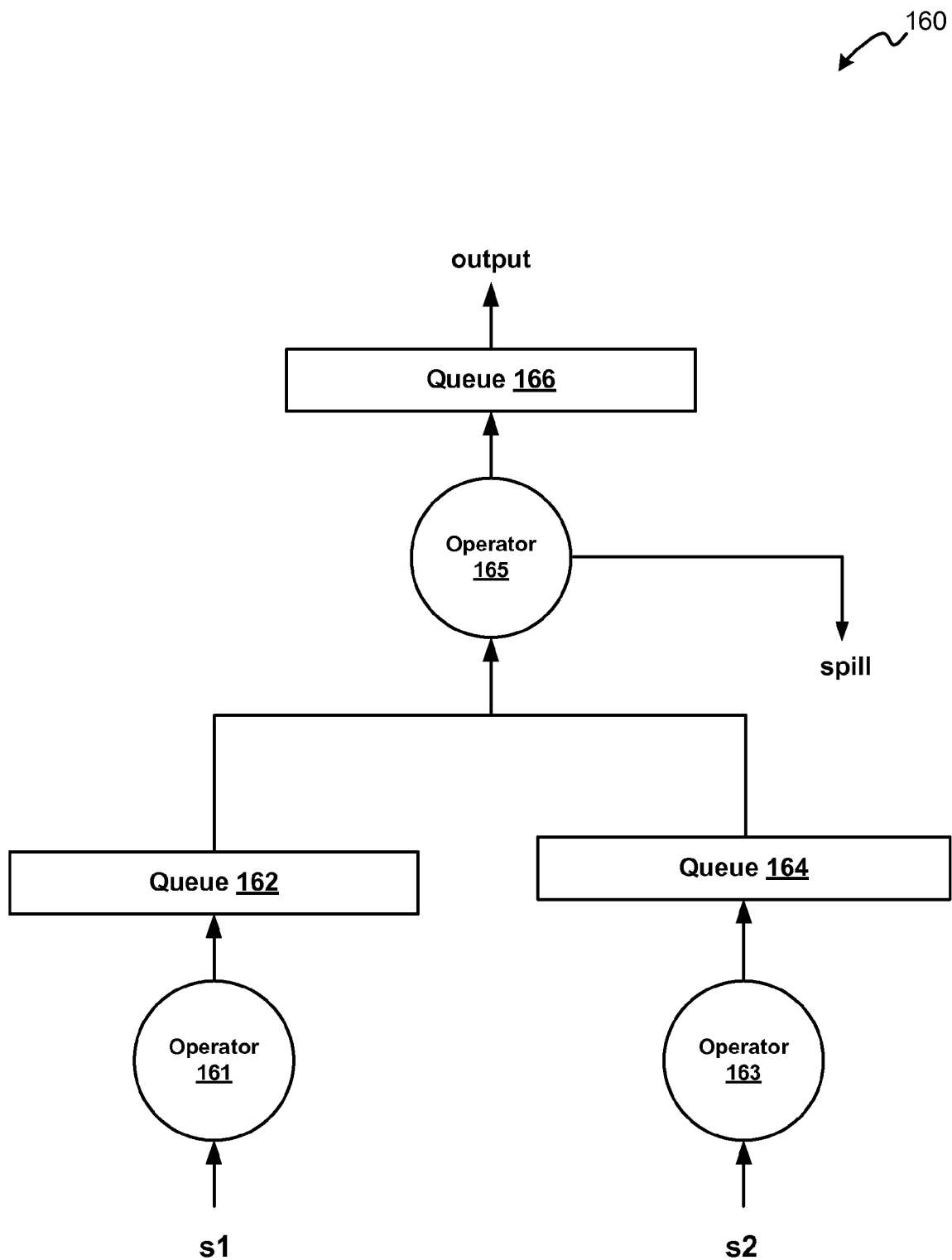
FIG. 1B is a simplified block diagram of a query plan in accordance with an embodiment of the present invention.

FIG. 1B is a simplified block diagram of a query plan 160 in accordance with an embodiment of the present invention. The query plan may be generated by Query Engine 120 for a continuous query applied to data streams received by EPS 110. Query plan 160 may include, one or more operators 161, 163, and 165, which perform operations on one or more tuples. For purposes of explanation, query plan 160 may be generated for the following query as written in continuous query language (CQL):

```
create view v1 (a) as select a from s1
create view v2 (a) as select a from s2
create view v (a) as v1 union all v2
```

As shown above, this query combines the output from two streams, s1 and s2. To carry out the query, two scan operators are required for each stream. In the context of the query shown above, operator 161 may be configured to perform a scan for stream s1, operator 163 may be configured to perform a scan for stream s2, and operator 165 may be configured to combine the results from the two scans. For example, operator 165 may perform a union or concatenation operation.

The output of an operator is stored in a queue. As depicted in FIG. 1B, query plan 160 also includes queue 162, queue 164, and queue 166. Queues 162, 164, and 166 are configured to pass state information about one or more tuples from one operator to another. Each operator 161, 163, and 165 may have its own queue. Queues 162, 164, and 166 can be stored in memory 140 of EPS 110.

As previously described, disk 150 is configured to store tuples which are spilled according to evict policy 131. As used herein, scheduling an operator includes adding a selected operator to a list in a scheduler. The operators run one after another in the list. When an operator is added to the list, it is deemed to be scheduled. In this manner, EPS 110 runs operators through the scheduler. Before an operator is scheduled, evict policy 131 is used by eviction engine 130 to determine when to evict. In one embodiment, this is accomplished by determining whether there is adequate free memory available in memory 140 for processing to be performed by the operator waiting to be scheduled. If so, the operator can be scheduled. Otherwise, it is determined that an eviction is needed.

Evict policy 131 may be used to select what to evict. In one embodiment, an operator is determined. Then, a tuple that is to be processed by the operator is determined. Data structures associated with the tuple may also be determined. As previously mentioned, data structures associated with a tuple (i.e., tuple data structures) may include a queue, a store, and a synopsis. Where the free memory is inadequate, the tuple data structures are selected for spilling to disk 170, according to evict policy 131. The selected tuple data structures are removed from memory 140 and spilled to disk 150.

For example, a scheduler which is configured to schedule the operators, determines if adequate memory is available prior to scheduling operator 165. Where the free memory is inadequate, the tuple data structures corresponding to operator 165 are removed from memory 140 and spilled to disk 150. As previously described, spilling may be performed at the page level. Accordingly, the whole page which includes the selected data structures is spilled. With every spill, the free memory level of memory 140 is increased. Operator 165 may then be scheduled.

During execution of query plan 160, operator 165 can transparently access the spilled page. Restoration of the spilled page is described in further detail in FIG. 5.

Figure 2:
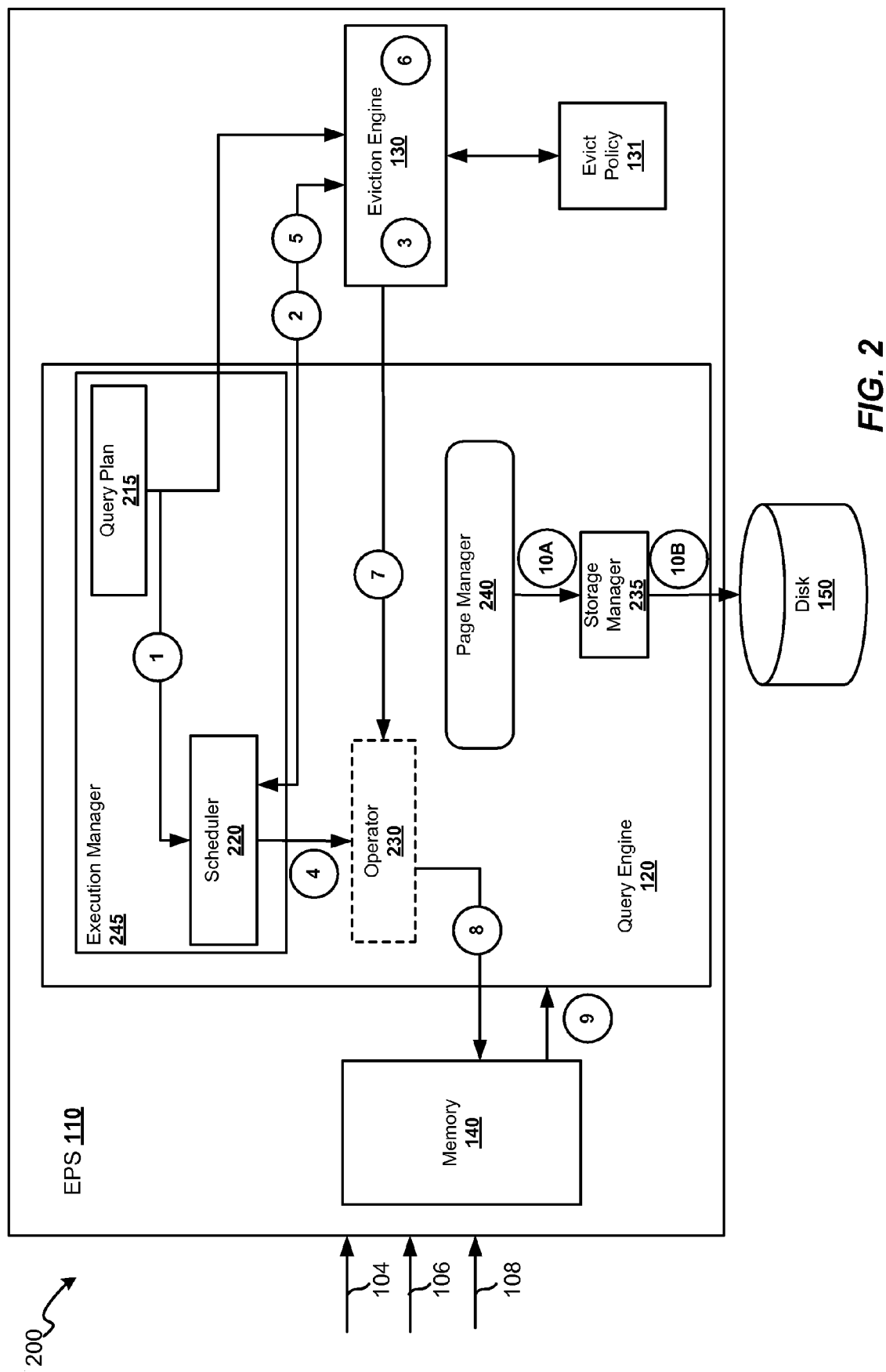
FIG. 2 depicts a simplified block diagram of a system that is configured to spill a page to a persistent store in accordance with embodiments of the present invention.

FIG. 2 depicts a simplified block diagram of a system 200 that is configured to spill a page to a persistent store in accordance with embodiments of the present invention. System 200 includes event processing server (EPS) 110 and disk 150. The components of EPS 110 as depicted in FIG. 2 may be implemented in software (e.g., code, instructions, program) executed by a processor, hardware, or combinations thereof. EPS 110 is configured to receive event streams 104, 106, 108. EPS 110 is comprised of memory 140, query engine 120, eviction engine 130, and evict policy 131.

Memory 140 is configured to store a sequence of <tuple, timestamp> pairs for tuples recived via data streams 104, 106, or 108. Specifically, memory 140 stores a state of a tuple, for example in the form of data structures associated with the tuple.

Query engine 120 is configured to evict tuples according to an eviction policy and to run continuous queries on the data sets. Query engine 120 includes an execution manager 245, a page manager 240, and a storage manager 235. Query engine 120 is configured to evict one or more pages of tuples.

Execution manager 245 is configured to keep track of the runtime state of query plan 215. Query plan 215 is a plan generated by EPS 110 and used by execution manager 245 to fulfill a query. Query plan 215 may include one or more operators. Execution manager 245 is comprised of scheduler 220, which is configured to schedule operators in query plan 215.

The following flow describes how operator-level eviction is performed. At step 1, scheduler 220 attempts to schedule one by one each of the operators in query plan 215. When a triggering event is determined, at step 2, scheduler 220 invokes a check eviction process in eviction engine 130. A triggering event may include a request to schedule an operator. For example, before the operator is actually scheduled, eviction engine 130 determines if an eviction is to be performed. For this example, eviction engine 130 is invoked only by scheduler 220 and before scheduling, thereby making eviction synchronous with scheduling.

Evict policy 131 specifies when to evict and what to evict. For example, evict policy 131 may identify when to evict by specifying that a comparison between an identified threshold and a level of free memory be performed. Evict Policy 131 may also specify what to evict. For example, identification of what to evict may occur at the operator level, data structure level, etc.

Eviction engine 130 is configured to enforce evict policy 131. Eviction engine 130 determines when to evict and what to evict. In one embodiment, to aid in its decision on when to evict and what to evict, eviction engine 130 determines which operators have already been scheduled and other pertinent information using query plan 215.

In response to the check eviction process invoked by scheduler 220, at step 3, eviction engine 130 is configured to determine when to evict according to evict policy 131. For example, eviction engine 130 identifies a threshold and compares the level of free memory to the identified threshold. Eviction engine 130 returns either a "true" (i.e., eviction required) or "false" (i.e., eviction not required) value to scheduler 220.

System 200 is multi-threaded, such that scheduler 220 can execute operators by running multiple threads. One issue of a multi-threaded system is that any number of operators can be running on the tuples, even though those tuples may be slated for eviction. To avoid such issues, all running operators may be completed prior to evicting. In one embodiment of the present invention, scheduler 220 allows the running operators to finish their operation, and then all operators are stopped. In another embodiment, all operators are stopped whether finished or not. As shown at step 4, where an eviction is required, scheduler 220 stops all running operators 230. By doing so, the system will not evict tuple data structures or pages of tuples which are referenced by a running operator. In other words, the system guarantees that no operator is running when the eviction is performed. This greatly simplifies the implementation because operators cannot be run at the same time as an eviction thread. In alternative embodiments, synchronization methodologies may be implemented such that threads which run the operators are synchronized with the eviction thread using a wait and notify scheme, for example, with PIN and unPIN commands.

At step 5, scheduler 220 invokes a run eviction process in eviction engine 130 if it is determined that an eviction should be performed. Thus far, evict policy 131 has been used to determine when to evict.

Referring to query plan 215 and evict policy 131, eviction engine 130 may also determine what to evict in response to the run eviction process, at step 6. In order to determine what to evict, eviction candidates may be identified according to a policy. An eviction candidate may be an object (e.g., operator, data structure, etc.) that is slated for possible eviction. For example, in operator-level spilling, an operator may be identified as an eviction candidate (eviction operator), and underlying data structures of tuples which are to be processed by the operator are determined and slated for spilling. In one embodiment, pages that include these tuples are spilled until the free memory level is below the memory threshold identified in step 3.

Different techniques may be used to determine the order in which operators are selected for spilling from multiple operators in a query plan. In one embodiment, operators are identified for eviction based on their hierarchical position in the query plan. For example, in one embodiment, a bottom-up policy may be used where the states of operators that are closer to the bottom of a query plan (i.e., lower hierarchical position) are spilled first. Spilling occurs from the bottom to the top of query plan 215 until the free memory becomes above the threshold. For example, for the query plan depicted in FIG. 1B, operator 161 is selected first, followed by operator 163, followed by operator 165, and so on. The rationale for bottom-up spilling is that operators at the top of the query plan, which are closer to the output of the query, are more likely to be accessed and as such should be kept in memory, rather than disk, for quick access.

According to another technique, it may be determined by how much the free memory level is below the threshold, i.e., the difference between the threshold and the free memory level. This difference may then be used to determine the operator to be selected for eviction. An operator can maintain information regarding its own memory usage. Evict policy 131 may use this information to select which operators to evict. In one embodiment, operators with the largest memory usage may be selected for eviction. For example, if the free memory level is far below the threshold, the operator with the largest memory usage may be selected. Pre-scheduled operators may be the last candidates selected for spilling in order to avoid having to reload pages for those operators when the scheduler resumes the operation. Thus, operators which have already been scheduled are generally the last candidates to be evicted.

In an alternative embodiment, a top-down approach may be used where spilling occurs from the top to the bottom of query plan 215 until the free memory becomes above the threshold. Other approaches may be configured for system 200 and implemented in alternative embodiments.

The eviction policy can be applied on different levels of granularity: global, operator level, and data structure level. For spilling at the data structure level, data structures are examined, instead of operators, and are evicted as needed.

In the case of operator-level spilling, at step 7, eviction engine 130 identifies one or more operators of the plurality of operators 230 as eviction candidates. All operators in query plan 215 are examined, and it is possible for multiple operators to be identified as eviction operators.

At step 8, tuple data structures corresponding to the eviction operator identified at step 7 are determined. In one embodiment of the present invention, all operators keep track of which tuple data structures they will process. As previously mentioned, data structures (such as a queue, store, synopsis, etc.) are associated with tuples. Query engine 120 identifies the tuple data structures, which are stored in memory 140.

At step 9, the location of the tuple data structures in memory 140 are identified for eviction. Where the tuple data structures corresponding to the eviction operator are stored in a page of memory 140, page location and tuple identification information is determined by page manager 240. In one embodiment, all tuples belonging to the page are evicted.

Page manager 240 is configured to manage pages in use, and more particularly, to allocate tuples to pages, keep track of which tuples are allocated to which pages, and spill the pages as needed. At step 10A, page manager 240 passes to storage manager 235 the page location. Storage manager 235 is configured to store into disk 150 the page(s) that were identified in step 10A. At step 10B, storage manager 235 stores the pages, identified at step 9, into disk 150.

After the pages have been stored on disk 150, the pages may be removed from memory 140. Page manager 240 may also remove from memory 140 the same page(s) that were stored on disk 150 in step 10B. In other embodiments, writing to disk 150 and removal from memory 140 can occur in any order.

Storage manager 235 supports storing and retrieving pages from disk 150. When stored on disk 150, simple file-based storage, key/value hash-based storage, key/value btree (i.e., binary tree) based storage, or the like may be implemented. Each page may include a header with a unique page identifier.

It should be noted that evict policy 131 is only invoked by scheduler 220. By binding the eviction process to the scheduler, evicted tuples are effectively prevented from being referenced by running operators. Additionally, this scheme alleviates the need to implement complex synchronization methods between running operators and eviction threads.

Figure 3A:
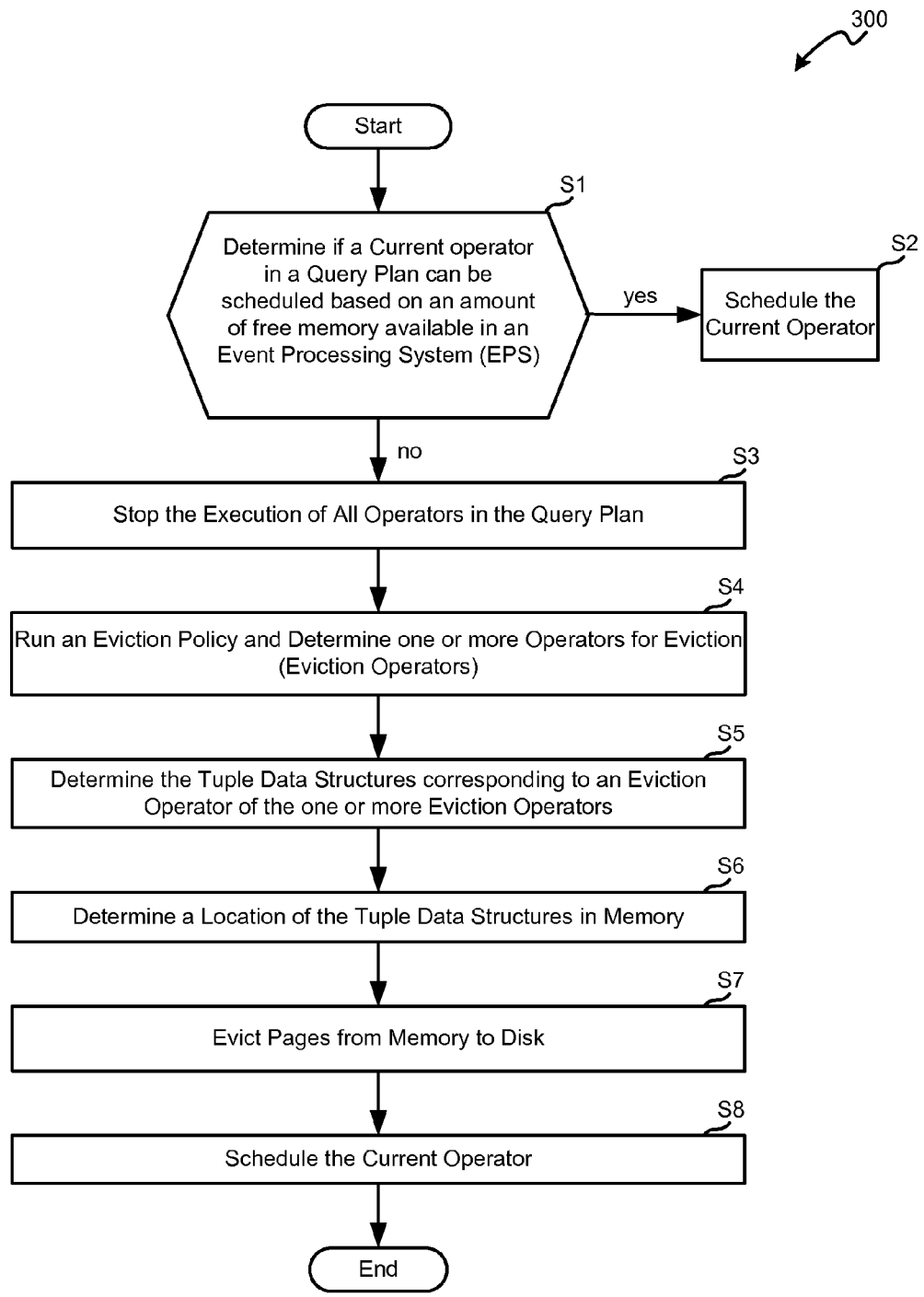
FIG. 3A depicts a simplified method for spilling pages of tuples to disk storage according to an embodiment of the present invention.

FIG. 3A depicts a simplified method 300 for spilling pages of tuples to disk storage according to an embodiment of the present invention. The processing depicted in FIG. 3A may be performed by software (e.g., code, instructions, program) executed by a processor, hardware, or combinations thereof.

At step S1, it is determined if a current operator in a query plan can be scheduled based on an amount of free memory available in an event processing server (EPS). In other words, it is determined when to evict. Specifically, operators in the query plan are examined one by one. Before a current operator is actually scheduled, a level of free memory available in the EPS is compared to a threshold, according to an eviction policy. Where the free memory level meets the threshold, the current operator being examined can be scheduled, as shown in step S2.

On the other hand, where the free memory level fails to meet the threshold, spilling is performed prior to scheduling the current operator. At step S3, the execution of all operators within the query plan are stopped. In one embodiment of the present invention, the EPS is multi-threaded such that spilling may be occurring while another thread is attempting to read the tuple which is being evicted. To address this potential synchronization issue, all executing operators are stopped thereby preventing one thread from accessing a tuple which is marked for eviction.

At step S4, the eviction policy is run. The eviction policy determines what to evict. One or more operators are identified for eviction/spilling. These operators may be referred to as "eviction operators." The tuple data structures corresponding to the eviction operator an eviction operator of the one or more eviction operators are determined at step S5. The location of the tuple data structures are determined at step S6. Specifically, if the tuple data structures are stored in pages, page identifiers of one or more pages which include the tuple data structures are determined. At step S7, the one or more pages are evicted from memory to disk. Eviction may include storing the one or more pages to disk 150 and removing the same pages from memory 140 using the page identifiers. At step S8, the current operator is scheduled. Process 300 may be iterated and tuples may be spilled to disk 150 as necessary.

Figure 3B:
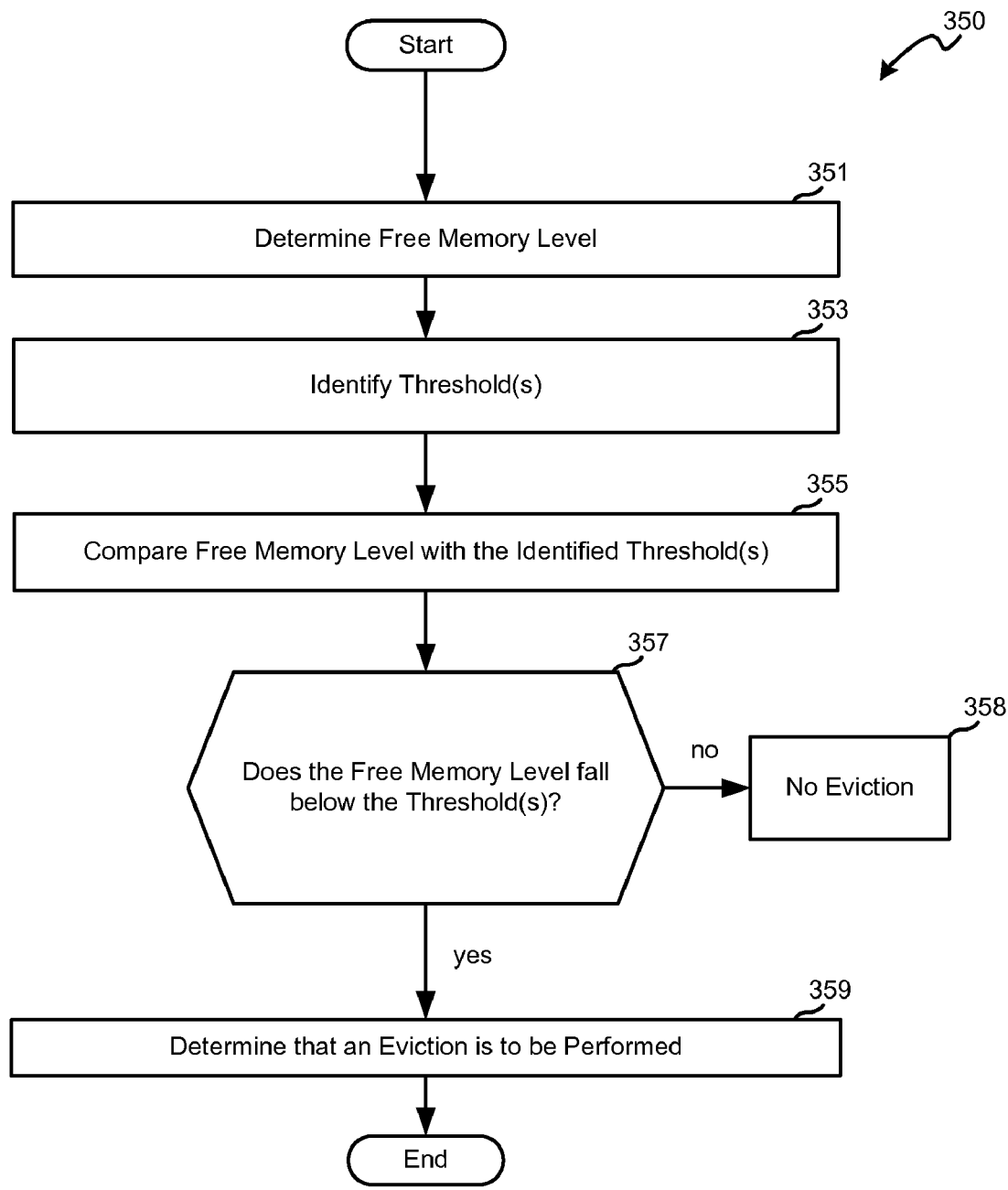
FIG. 3B depicts a simplified method for determining when to perform an eviction according to an embodiment of the present invention.

FIG. 3B depicts a simplified method for determining when to perform an eviction according to an embodiment of the present invention. The processing depicted in FIG. 3B may be performed by software (e.g., code, instructions, program) executed by a processor, hardware, or combinations thereof.

At step 351, a level of free memory is determined. A free memory level is the measurement of memory that is available at the time of measurement. At step 353, a memory threshold is identified. In one embodiment of the present invention, a complex threshold methodology can be implemented using multiple memory thresholds. A first threshold may be an initial threshold for an initial mode, and a second threshold may be a low threshold for a normal mode where the memory usage is fairly low. In alternative embodiments of the present invention, a third threshold may be implemented, such that the system level of free memory is compared against the range of the low threshold and a third threshold. The third threshold may be a third threshold for a high mode where the memory usage is high.

The threshold identification may be made based on the value of a parameter (i.e., allocation count) that tracks the number of invocations of a run evictor process. If the number of invocations is zero, meaning no work has been done by scheduler 220, the initial threshold is used. In other words, the allocation count parameter tracks if scheduler 220 has scheduled operators as yet for the continuous stream.

The initial threshold represents the minimum amount of free memory required before spilling is to be performed. The initial threshold is significant enough to ensure that there is enough working memory for a storage system or memory 140 while maximizing the utilization of the memory. In one embodiment, the initial threshold reserves a normal threshold plus the cache size of the storage system or memory 140. By default, 10% of the total memory is reserved for the storage system or memory 140.

If the number of invocations is more than zero, meaning work has been done by scheduler 220, the low threshold is used. The low threshold represents the minimum amount of free memory required before spilling is to be performed. The low threshold is lower than the initial threshold. For example, by default, the low threshold may require less than 10% (such as 8%) of the total memory to be free.

In another embodiment, multiple thresholds may be identified. For example, the high and low thresholds may be identified, such that the free memory level of the system may be measured against a range of the high and low threshold. At step 355, the free memory level is compared to the identified threshold(s).

At step 357, it is determined whether the free memory level falls below the identified threshold(s). The initial mode considers the initial threshold identified at step 353 for a time period before any first eviction occurs. For example, if 10% or more of the memory is free, processing continues to step 358 where it is determined that no eviction is required. Otherwise, it is determined that eviction is required in step 359.

The normal mode uses the low threshold where the allocation count is greater than zero. For example, if 8% or more of the memory is free, processing continues to step 358 where it is determined that no eviction is required. Otherwise, it is determined that eviction is required in step 359.

The high mode compares the free memory level of the system against the range of the low threshold and the third threshold, as identified in step 353. The third threshold represents the minimum amount of free memory required before spilling is to be performed. The minimum amount of free memory represented by the third threshold (such as 5%) is lower than the minimum amount of free memory represented by the low threshold (such as 8%).

In this mode, there are three scenarios. First, if the level of free memory exceeds the low threshold and if the number of invocations is considered (i.e., more than 0), processing continues to step 358 where it is determined that no eviction need be performed. Second, if the level of free memory falls in between the low threshold and the third threshold, and if number of invocations is considered (i.e., more than 0), it is determined that eviction is required at step 359. Third, if the level of free memory falls below the third threshold, eviction will be performed without consideration of the number of invocations. In other words, if the free memory level is lower than the third threshold, processing continues to step 359 where it is determined that eviction is required, regardless of whether or not scheduler 220 has done any work.

In alternative embodiments, the threshold methodology can be configured and the conditions for triggering an eviction policy (i.e., when to evict) can also be configured.

Figure 4:
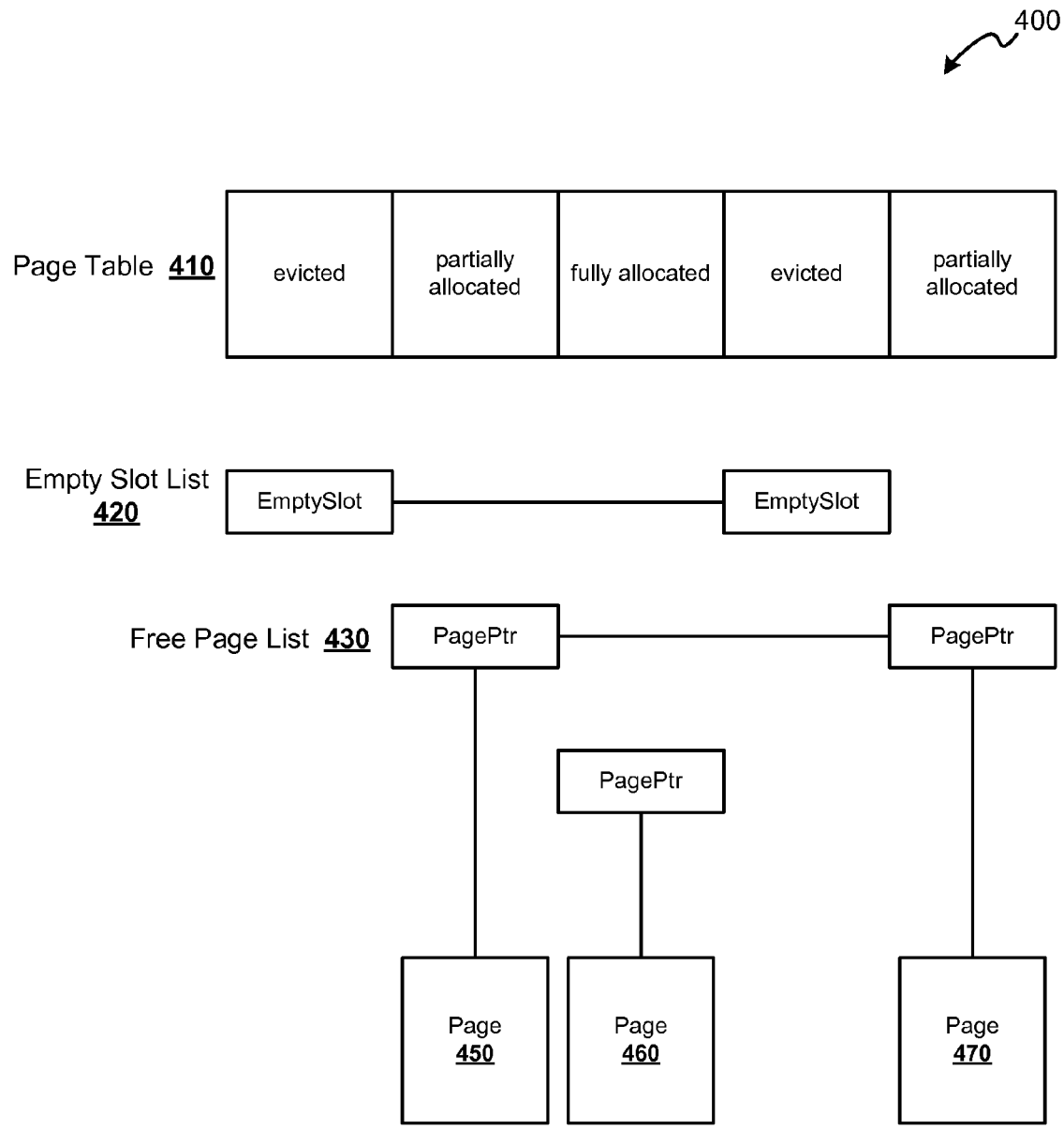
FIG. 4 depicts a simplified block diagram of a page manager system in accordance with embodiments of the present invention.

FIG. 4 depicts a simplified block diagram of a page manager system 400 in accordance with embodiments of the present invention. Page manager system 400 is configured to manage pages in use, and more particularly, to allocate tuples to pages in memory, keeping track of which tuples are allocated to which page, and spill-out the pages as needed.

In one embodiment of the present invention, tuples may be grouped in a page. A page is a structure for storing a collection of tuples. A page may be implemented as an array of tuples or other similar construct. In another embodiment of the present invention, a page may include an individual array for every attribute of an object. For example, as previously described, a tuple may be considered to be logically similar to a single row or record in a relational database and the attributes of the tuple are represented by columns. As such, a page may include an array for every column (i.e., attribute) of the tuple. For example, column 1 might represent an integer, column 2 might represent a float, etc. Each column may be implemented as an individual array, such that array_integer is an array with integer values of multiple tuples and array_float is an array with float values of multiple tuples, for example. The page construct makes manipulation of tuples, including storage and removal of tuples, more efficient. Storage by page, as opposed to storage by individual tuples, decreases overhead by minimizing the disk access.

Page manager system 400 may include page table 410, empty slot list 420, and free page list 430. Page table 410 is configured to keep the pages in use indexed by a page identifier. Page table 410 may be an array of page pointers (PagePtr), or similar construct, which thereby implements the allocation of tuples to pages in memory. The array elements of page table 410 are accessed via a page identifier.

Empty slot list 420 is configured to maintain a list of the empty slots or pages on page table 410. Free page list 430 is configured to maintains a list of pages on page table 410 which have been partially allocated and capable of further allocation. Free page list 430 may be implemented as an array of page pointers. As shown, free page list 430 includes PagePtrs to pages 450, 460, and 470.

In one embodiment of the present invention, an allocation scheme may be implemented by allocating tuples first to a partially allocated page, using the free page list 430. Where a partially allocated page exists, the tuple is allocated to a page at the head of the free page list 430. Partially allocated pages are filled-up until fully allocated. If a page is full and is positioned at the head of the free page list 430, the page is removed from the free page list 430.

Where the free page list 430 indicates that there are no partially allocated pages which are capable of further allocation, a new page may be added. For example, a page from empty slot list 420 may be added to free page list 430 and tuples are allocated to the new page. In another embodiment of the present invention, where the empty slot list 420 is empty and all pages pointed to by page table 410 are completely full, a new page is added, page table 410 is updated to reflect the new page.

The tuple that is to be spilled may be evicted by eviction of the page to which it belongs. As previously described, tuples may be stored in pages in memory when received in an event stream. A free tuple scheme may be implemented such that tuples that have been identified for spilling are evicted from a belonging page in memory. After storing these tuples on disk, these tuples may be evicted or otherwise removed from a belonging page in memory. Where the page is empty, page table 410 is updated with an empty slot and empty slot list 420 is updated. In other embodiments of the present invention, page manager system 400 can support various allocation and free tuple schemes. The default allocation scheme is a "first fit" policy.

Figure 5:
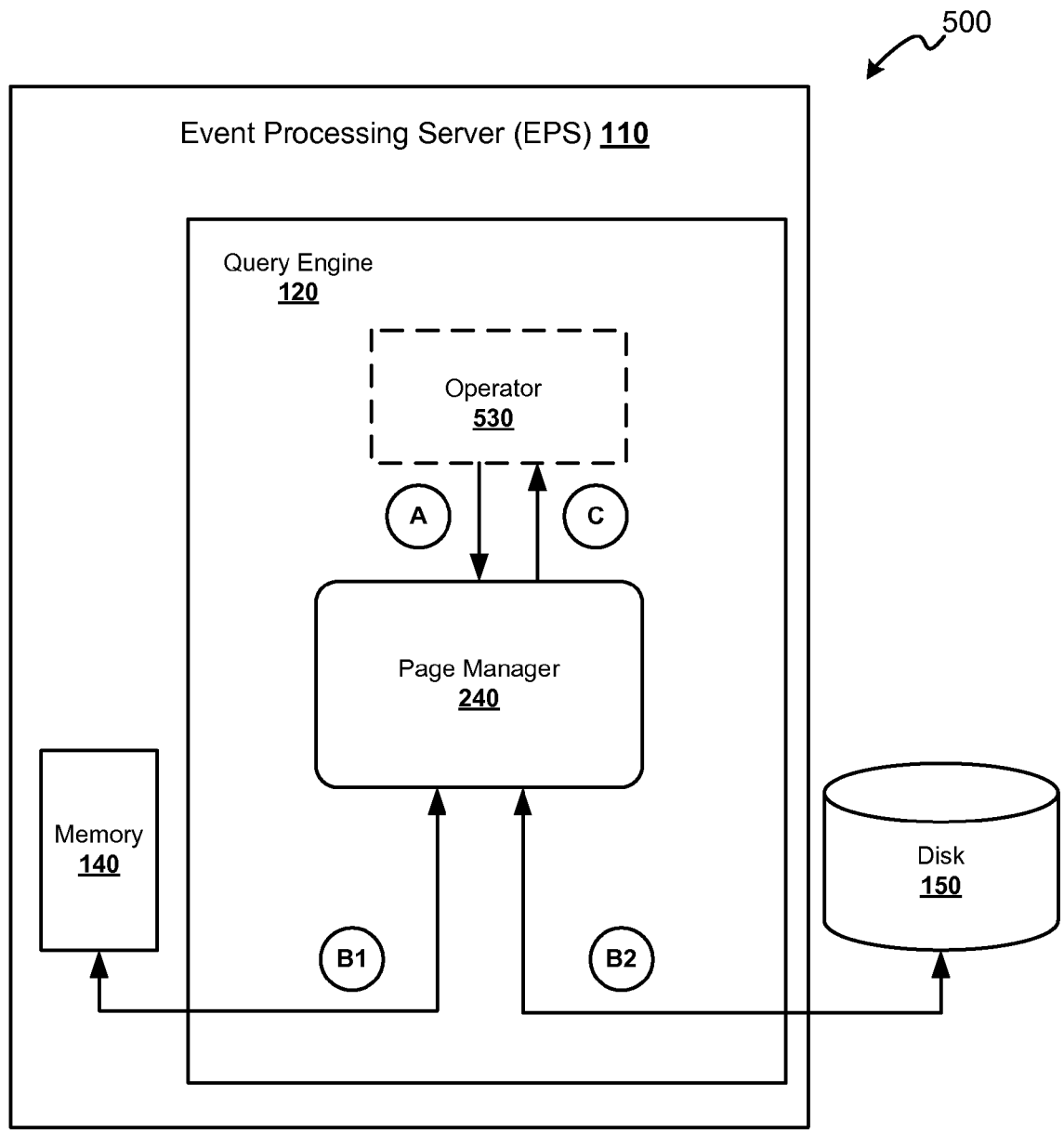
FIG. 5 is a simplified block diagram which illustrates a restoration of spilled pages.

FIG. 5 is a simplified block diagram which illustrates a restoration of spilled pages. As depicted in FIG. 5, system 500 includes EPS 110 and disk 150. EPS 110 is comprised of query engine 510 and memory 140. Query engine 510 includes page manager 240 and operator 530. As events in one or more event streams are received, tuples are stored in pages within memory 140. Pages may be subject to spilling into disk 150 before operators of a query plan are scheduled. After eviction, the scheduler 220 restarts all of the operators in the query plan. During execution, operator 530 accesses the tuples (and its associated data structures) that it will process using a unique page identifier and an offset within the page.

At step A, operator 530 requests page manager 240 to provide a tuple from a belonging page using the unique page identifier and offset within the page. Page manager 240 uses the received page identifier and offset to index a page table, such as page table 410 in FIG. 4. An entry of the page table is located and it is determined whether the entry includes a page pointer to the requested page in memory 140. If the page pointer indicates that the page was not spilled, then page manager 240 retrieves the requested tuple at step B1 from memory 140. Page manager 240 may then return the requested tuple to operator 530 at step C.

The page pointer may indicate that the page was spilled, for example by pointing to a NULL value. Where the page pointer is NULL, page manager 240 uses the received page identifier to retrieve the tuple from disk 150 at step B2. As previously described, pages can be stored with a header that includes the unique page identifier. Headers of pages in disk 150 may be searched for a matching page identifier. Specifically, a PIN function may be performed before accessing the requested tuple from the page using a tuple pointer. The tuple pointer is the wrapper of the tuple in memory. In one embodiment of the present invention, all tuples have a tuple pointer. PIN is a function in the tuple pointer structure. An operator can use the PIN function on the tuple pointer for access to the tuple. Loading the requested tuple to memory can be performed independently from an eviction. Accordingly, there is no concern that loading would be interrupted by eviction. Likewise, an eviction process is not interrupted by a load. Page manager 240 may then return the requested tuple to operator 530 at step C.

It should be mentioned that operator 530 need not be concerned with whether the tuple belongs to a page that is stored in memory 140 or was spilled out to disk 150. Page manager 240 maintains this indirection by returning the requested tuple from the source in a transparent manner.

Optimizations

Those skilled in the art recognize that there may be performance degradations when an event processing server uses a spilling mode. For example, access to the tuples is provided through the PIN operation which can be costly in terms of time because the tuple is prevented from being accessed by other operators. Moreover, evictions themselves require significant overhead when writing to disk. As such, event processing servers may be optimized by selectively invoking the spilling mode.

In one embodiment of the present invention, a hybrid mode is used, such that the event processing server alternates between the spilling mode and a memory mode. Using hints in the queries, only a portion of the query plan uses the spilling mode while the default is the memory mode (i.e., spilling mode is disabled). The conditions upon which the event processing server enables the spilling mode are variable. For example, the spilling mode may be enabled when a range window size of a query exceeds a window size threshold. Although conditions may be created on the fly, it is most beneficial when users of the event processing server know the pattern of the workload for each query.

In another embodiment of the present invention, a dynamically switching mode is used, such that the event processing server dynamically alternates between the spilling mode and a memory mode. The event processing server can start with a memory mode so that performance degradation is not incurred. The memory mode can be dynamically switched to a spilling mode when the memory usage increases, for example in a bursty event stream. The eviction policy may monitor the free memory levels and may signal when a switch to a spilling mode is necessary, such as when memory usage exceeds a pre-configured usage threshold, free memory levels fall below a free memory threshold, etc. When in the spilling mode, a switch to the memory mode may occur when the memory usage is below the usage threshold, free memory levels rise above the free memory threshold, etc. Other optimizations are also contemplated to selectively enable and disable the spilling mode.

Figure 6:
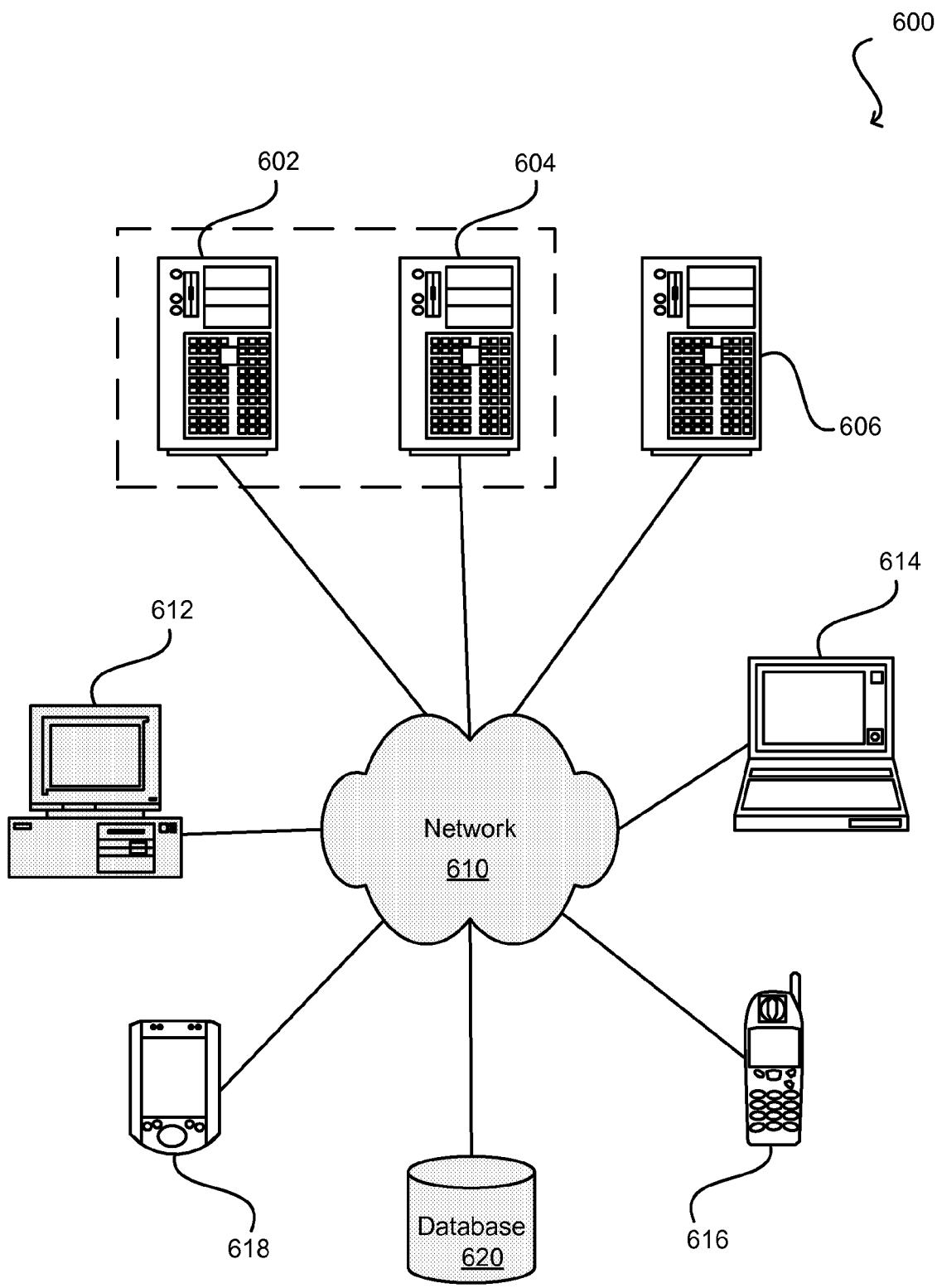
FIG. 6 is a block diagram illustrating components of an operating environment in which various embodiments of the present invention may be implemented.

FIG. 6 is a block diagram illustrating components of an operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10g, that is adapted to store, update, and retrieve data in response to SQL-formatted commands.

Figure 7:
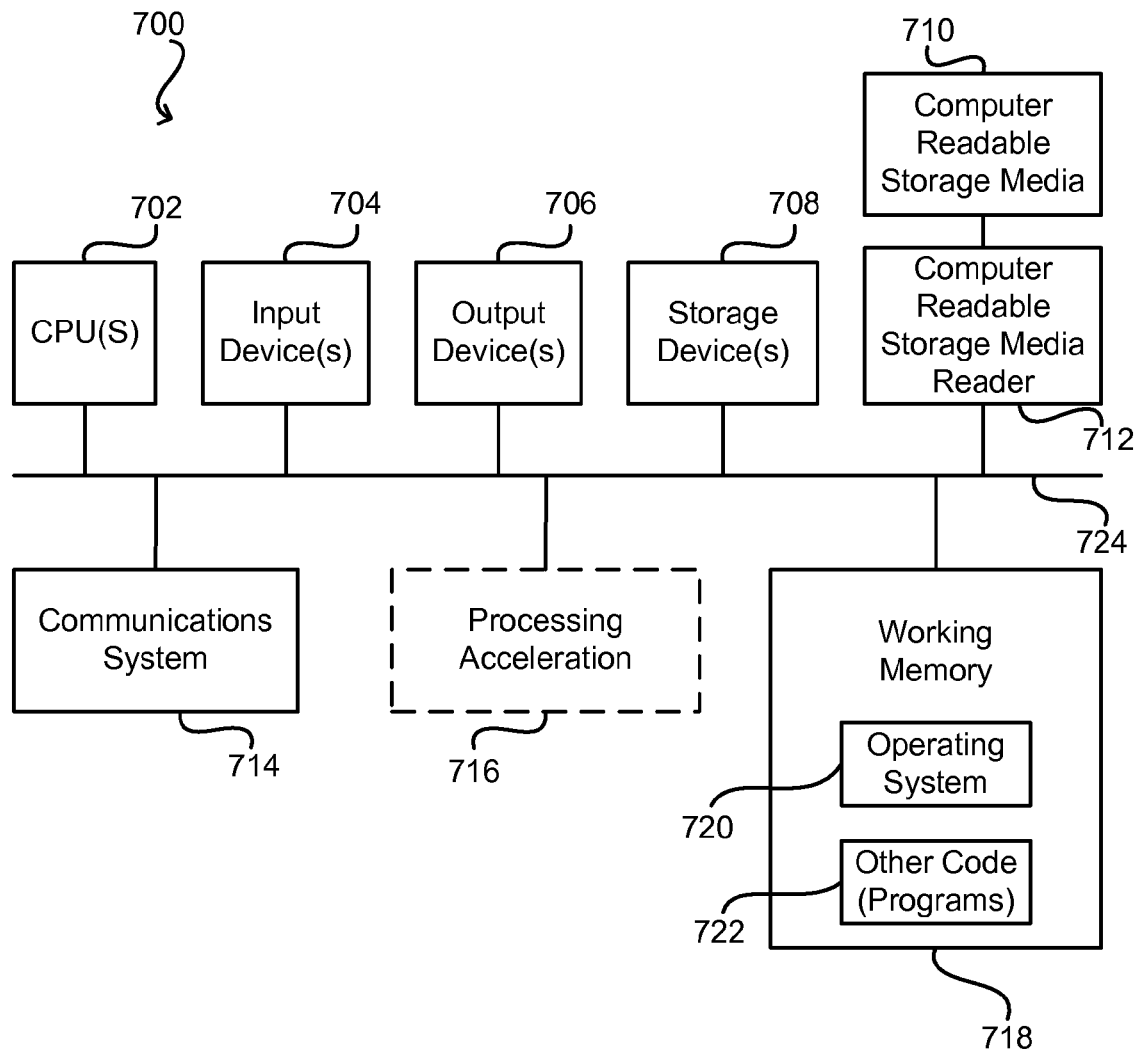
FIG. 7 illustrates a computer system in which various embodiments of the present invention may be implemented.

FIG. 7 illustrates a computer system 700, in which various embodiments of the present invention may be implemented. The system 700 may be used to implement any of the computer systems described above, such as EPS 110. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof. It will be recognized by those skilled in the art that while the invention is described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded in an illustrative rather than a restrictive sense.

What is claimed is:

1. A method for managing memory usage in a processing system, the method comprising:
  receiving a data stream comprising a plurality of tuples;
  determining a query plan generated for a continuous query applied to the plurality of tuples in the data stream, the query plan including one or more operators;
  determining a level of free memory associated with the processing system;
  prior to scheduling an operator of the one or more operators, determining whether the operator of the one or more operators can be scheduled based at least in part on the level of free memory of the processing system;
  in response to determining that the operator of the one or more operators cannot be scheduled, determining an eviction candidate; and
  evicting, from the memory to a persistent storage, a page associated with the eviction candidate.

2. The method of claim 1, wherein the evicted page is comprised of one or more tuples to be processed by the eviction candidate.

3. The method of claim 1, further comprising:
storing the evicted page to the persistent storage.

4. The method of claim 1, wherein the processing system is multi-threaded.

5. The method of claim 1, further comprising:
sending an instruction to stop execution of the one or more operators.

6. The method of claim 1, further comprising:
comparing a threshold with the level of free memory; and
determining that eviction is required where the level of free memory falls below the threshold.

7. The method of claim 1, further comprising:
determining whether operators have been scheduled for the data stream;
comparing the level of free memory with a range comprising a first threshold specified in an evict policy and a second threshold specified in the evict policy; and
determining that eviction is required based on the comparison using the range.

8. The method of claim 1, wherein the eviction candidate is determined based on a hierarchical position in the query plan.

9. The method of claim 8, wherein operators at a low hierarchical position in the query plan are identified as eviction candidates.

10. The method of claim 1, further comprising:
identifying a page identifier for the page associated with the eviction candidate, wherein eviction is performed using the page identifier.

11. The method of claim 1, further comprising:
executing the operator;
requesting a first tuple of a one or more tuples to be processed by the operator;
determining whether the first tuple is stored in the memory using a page identifier; and
retrieving the first tuple using the page identifier.

12. The method of claim 10, wherein the page identifier corresponds to a page pointer that refers to a page in the memory which includes the first tuple.

13. The method of claim 10, wherein the first tuple is retrieved from the persistent storage using the page identifier, where the page pointer refers to a null value.

14. The method of claim 1, wherein eviction is selectively performed when a range window size of a query exceeds a size threshold.

15. A computer program product embedded in a computer readable storage medium and including executable instructions for managing memory usage of the processing system, the computer program product comprising:
computer code for receiving a data stream comprising a plurality of tuples;
computer code for determining a query plan generated for a continuous query applied to the plurality of tuples in the data stream, the query plan including one or more operators;
computer code for determining a level of free memory associated with the processing system;
computer code for prior to scheduling an operator of the one or more operators, determining whether the operator of the one or more operators can be scheduled based at least in part on the level of free memory of the processing system;
computer code for determining an eviction candidate in response to determining that the operator of the one or more operators cannot be scheduled; and
computer code for evicting, from the memory to a persistent storage, a page associated with the eviction candidate.

16. The computer program product of claim 15, further comprising:
computer code for sending an instruction to stop execution of the one or more operators.

17. The computer program product of claim 15, further comprising:
computer code for comparing a threshold with the level of free memory; and
computer code for determining that eviction is required where the level of free memory falls below the threshold.

18. A system for managing memory usage of the processing system, the system including a processor and a memory device including instructions that, when executed by the processor, cause the processor to:
receive a data stream comprising a plurality of tuples;
determine a query plan generated for a continuous query applied to the plurality of tuples in the data stream, the query plan including one or more operators;
determine a level of free memory associated with the processing system;
prior to scheduling an operator of the one or more operators, determine whether the operator of the one or more operators can be scheduled based at least in part on the level of free memory of the processing system;
determine an eviction candidate in response to determining that the operator of the one or more operators cannot be scheduled; and
evict, from the memory to a persistent storage, a page associated with the eviction candidate.

19. The system according to claim 18, wherein the instructions, when executed by the processor, further cause the processor to:
send an instruction to stop execution of the one or more operators.

20. The system according to claim 18, wherein the instructions, when executed by the processor, further cause the processor to:
compare a threshold with the level of free memory; and
determine that eviction is required where the level of free memory falls below the threshold.

* * * * *

UNITED STATES PATENT AND TRADEMARK OFFICE
CERTIFICATE OF CORRECTION

PATENT NO. : 8,352,517 B2
APPLICATION NO. : 12/395871
DATED : January 8, 2013
INVENTOR(S) : Park et al.

It is certified that error appears in the above-identified patent and that said Letters Patent is hereby corrected as shown below:

On the title page, item [56];

On page 3, in column 2, under "Other Publications", line 33, delete "SIDART" and insert -- SIGART --, therefor.

On page 3, in column 2, under "Other Publications", line 71, delete "PostgresSQL:" and insert -- PostgreSQL: --, therefor.

On page 3, in column 2, under "Other Publications", line 71, delete "PostgresSQL" and insert -- PoslgreSQL --, therefor.

On page 4, in column 1, under "Other Publications", line 1, delete "PostgresSQL:" and insert -- PostgreSQL: --, therefor.

On page 4, in column 1, under "Other Publications", line 1, delete "PostgresSQL" and insert -- PostgreSQL --, therefor.

On page 4, in column 1, under "Other Publications", line 21, delete "strem" and insert -- stream --, therefor.

On page 5, in column 1, under "Other Publications", line 5, delete "el al" and insert -- et al. --, therefor.

In the Specifications;

In column 7, line 28, delete "recived" and insert -- received --, therefor.

Signed and Sealed this
Ninth Day of April, 2013

Teresa Stanek Rea
*Acting Director of the United States Patent and Trademark Office*